(12) United States Patent
German et al.

(10) Patent No.: US 8,418,365 B2
(45) Date of Patent: Apr. 16, 2013

(54) HEAT EXCHANGER COMPRISING DEEP-DRAWN HEAT EXCHANGER PLATES

(75) Inventors: Johann German, Weinstadt (DE); Robert Ritter, Ulm (DE); Thomas Soczka-Guth, Schelklingen (DE)

(73) Assignee: Daimler AG, Stuttgart (DE)

( * ) Notice: Subject to any disclaimer, the term of this patent is extended or adjusted under 35 U.S.C. 154(b) by 1195 days.

(21) Appl. No.: 12/160,036

(22) PCT Filed: Dec. 22, 2006

(86) PCT No.: PCT/EP2006/012500
§ 371 (c)(1),
(2), (4) Date: Nov. 7, 2008

(87) PCT Pub. No.: WO2007/076985
PCT Pub. Date: Jul. 12, 2007

(65) Prior Publication Data
US 2009/0301700 A1 Dec. 10, 2009

(30) Foreign Application Priority Data
Jan. 4, 2006 (DE) .......................... 10 2006 000 885

(51) Int. Cl.
*B21D 53/06* (2006.01)
(52) U.S. Cl.
USPC .............. 29/890.047; 29/890.03; 29/890.035; 29/890.043; 29/890.045; 29/890.046; 29/890.054; 165/153; 165/167
(58) Field of Classification Search .. 29/890.03–890.06; 165/167, 153, 916
See application file for complete search history.

(56) References Cited

U.S. PATENT DOCUMENTS

| 4,471,759 | A | | 9/1984 | Anderson et al. | |
| 4,689,465 | A | | 8/1987 | Pal | |
| 5,024,269 | A | * | 6/1991 | Noguchi et al. | ............ 165/153 |
| 6,223,970 | B1 | | 5/2001 | Chen | |

(Continued)

FOREIGN PATENT DOCUMENTS

| CA | 2 290 230 A1 | 5/2000 |
| DE | 2 029 783 | 12/1971 |

(Continued)

OTHER PUBLICATIONS

International Search report dated Jun. 29, 2007 with English translation of relevant portion (Eighteen (18) Pages).

(Continued)

*Primary Examiner* — Richard Chang
(74) *Attorney, Agent, or Firm* — Crowell & Moring LLP

(57) ABSTRACT

In a method for producing a heat exchanger tube bundle for a heat exchanger of an electrochemical energy accumulators, heat exchanger channels and an intended profile are incorporated into material strips by deep drawing. A forward-flow distribution aperture is incorporated into a first such material strip from step b) (first heat exchanger plate), and return collecting apertures are incorporated into a second such material strip, forming first and the second heat exchanger plates. The latter are aligned in such a manner that webs of the two heat exchanger plates border each other, and the heat exchanger channels form heat exchanger tubes. The heat exchanger plates arranged in this manner are joined together to form a heat exchanger tube bundle. A corresponding pressure welding apparatus, a heat exchanger tube bundle, a heat exchanger module, a heat exchanger with two or more heat exchanger modules, and an electrochemical energy accumulator with a heat exchanger of this type are also disclosed.

8 Claims, 13 Drawing Sheets

U.S. PATENT DOCUMENTS

| | | |
|---|---|---|
| 6,228,524 B1 | 5/2001 | Koehler et al. |
| 7,291,420 B2 | 11/2007 | Bitsche et al. |
| 7,404,434 B2 * | 7/2008 | Martin et al. ............... 165/167 |
| 2004/0069620 A1 | 4/2004 | Bitsche et al. |
| 2005/0170240 A1 | 8/2005 | German et al. |
| 2005/0170241 A1 | 8/2005 | German et al. |

FOREIGN PATENT DOCUMENTS

| | | |
|---|---|---|
| DE | 92 10 384.7 U1 | 11/1992 |
| DE | 196 39 115 A1 | 3/1998 |
| DE | 198 49 491 C1 | 1/2000 |
| DE | 198 53 526 A1 | 5/2000 |
| DE | 100 57 240 C1 | 4/2002 |
| DE | 102 38 235 A1 | 3/2004 |
| DE | 10 2004 005 393 A1 | 8/2005 |
| DE | 10 2004 005 394 A1 | 8/2005 |
| EP | 0 162 192 B1 | 11/1985 |
| EP | 0 917 230 A1 | 5/1999 |
| FR | 2 793 717 A3 | 11/2000 |
| GB | 2 269 476 A | 2/1994 |
| GB | 2 391 296 A | 2/2004 |
| JP | 8-197258 A | 8/1996 |
| JP | 10-170176 A1 | 6/1998 |
| JP | 2001-259863 A | 9/2001 |
| JP | 2004-504702 A | 2/2004 |
| JP | 2005-222939 A | 8/2005 |
| WO | WO 02/07249 A1 | 1/2002 |

OTHER PUBLICATIONS

German Office Action dated Jun. 14, 2006 (Three (3) Pages).
Japanese Office Action dated Mar. 23, 2011 (Three (3) pages).

* cited by examiner

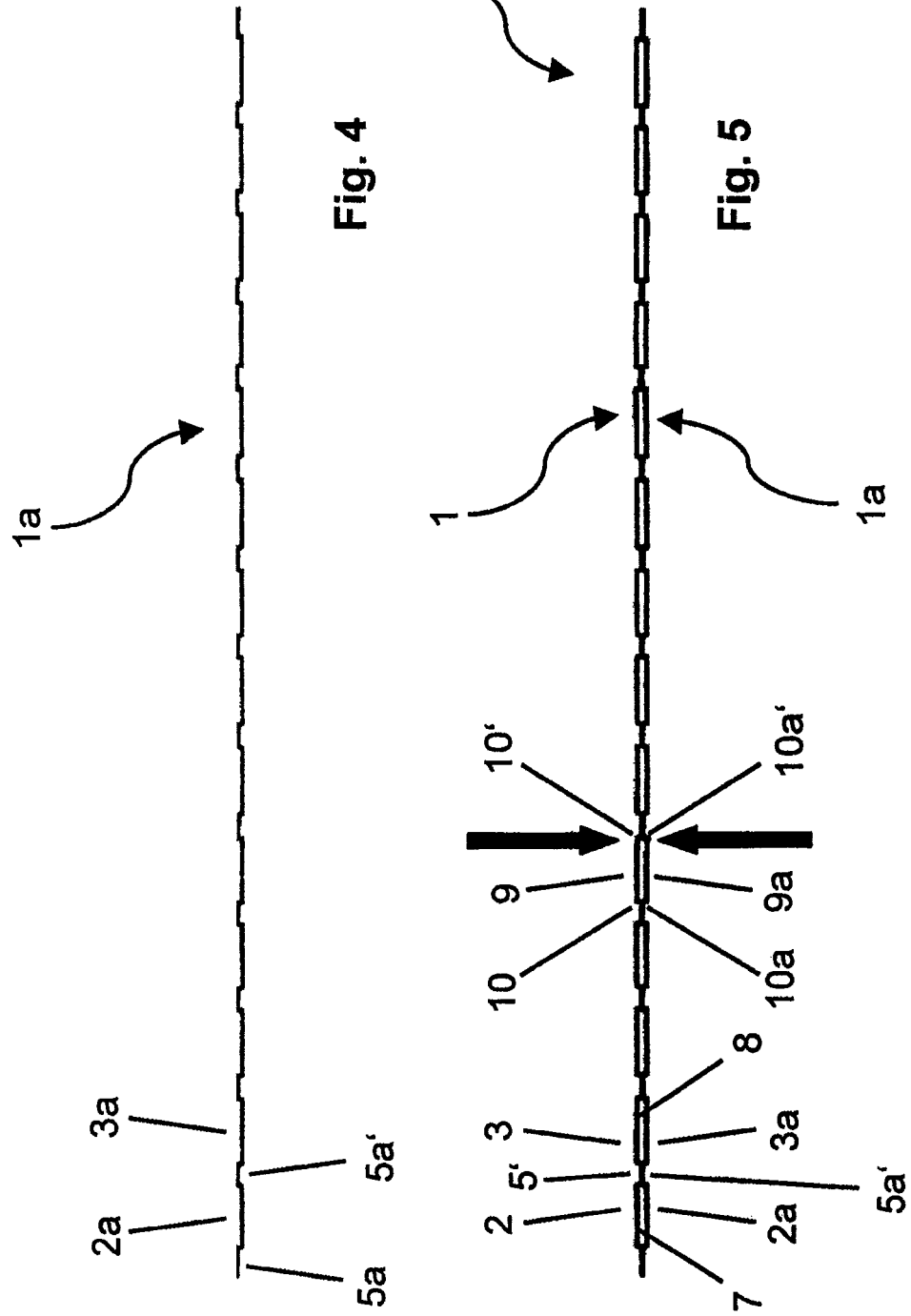

HEAT EXCHANGER COMPRISING DEEP-DRAWN HEAT EXCHANGER PLATES

This application is a national stage of International Application No. PCT/EP2006/0012500, filed Dec. 22, 2006, which claims priority under 35 U.S.C. §119 to German Patent Application No. 10 2006 000 885.5, filed Jan. 4, 2006, the entire disclosure of which is herein expressly incorporated by reference.

BACKGROUND AND SUMMARY OF THE INVENTION

The invention relates to methods for producing a heat exchanger tube bundle for heat exchangers of electrochemical energy accumulators. It also provides a pressure welding apparatus for carrying out a variant of the methods, a heat exchanger tube bundle obtainable according to the methods, a heat exchanger module with a heat exchanger tube bundle of this type, a heat exchanger with two or more heat exchanger modules of this type, an electrochemical energy accumulator with a heat exchanger of this type, and a use of an electrochemical energy accumulator of this type. The invention is industrially usable in the field of the production and use of electrochemical energy accumulators.

Modern electrochemical high-performance energy accumulators (for short: high-performance batteries), such as, for example, nickel metal hydride batteries and lithium ion batteries, not only require elaborate battery management, but also efficient temperature control of the individual electrochemical storage cells (for short: individual cells) in order to ensure as good a performance of the electrochemical energy accumulator as possible and to prevent damage thereto.

An electrochemical energy accumulator of this type is revealed in German patent document DE 10 2004 005 394 A1. The electrochemical energy accumulator has heat exchanger modules (called heat exchanger units there), between the heat exchanger tube bundles of which (called heat exchanger channels there) a plurality of individual cells can each be arranged next to one another in at least two adjacent rows. A temperature-control medium can flow through the heat exchanger modules, heat exchanger tube bundles and forward-flow distribution tubes and return collecting tubes (called flow distribution channels there) etc.

The heat exchanger tube bundles are usually produced from injection-molded plastic plates with a wavy profile, into which heat exchanger channels are milled. Adjacent heat exchanger channels are each separated from one another and from the surroundings by means of webs of material which is not removed during the milling operation. Two milled plates are then arranged one above the other, such that milled portion lies above milled portion, and web lies on web. The plates are subsequently joined together by laser welding in the region of the webs bearing against one another.

This method has several disadvantages. For example, injection-molded plastic plates can be integrated into series production only with difficulty. In addition, the milling of the wavy plastic plates is complicated and leads to a high reject rate which, under unfavorable circumstances, can amount to up to 40%. Furthermore, because of the wavy profile of the injection-molded plastic plates, laser welding is likewise complicated and prone to error. For example, even a slight deviation of the plastic plates from the ideal wave profile is sufficient to cause welding errors, which in turn cause the heat exchanger tubes to be loose in relation to one another or in relation to their surroundings. Furthermore, although the joined-together heat exchanger tube bundles are very stable in relation to inwardly directed compressive forces because of the webs which remain during the milling operation, they are, however, highly inflexible. As a result, heat exchanger tube bundles and individual cells have to be pressed against one another with a relatively high force in order to provide optimal heat-conductive (i.e., in particular gap-free or form-fitting) contact between heat exchanger tube bundle and individual cells.

One object of the present invention is to overcome the above-mentioned disadvantages of the prior art.

This and other objects and advantages are achieved by the method according to the invention for producing a heat exchanger tube bundle for heat exchangers of electrochemical energy accumulators, in which a plurality of electrochemical storage cells (for short: individual cells) are arranged next to one another in at least two adjacent rows. Heat exchanger tube bundles which fit closely against the individual cells in a form-fitting manner are arranged between the adjacent rows.

According to the invention, the method has the following steps:

a) two deep-drawable material strips, for example plates or blanks, are supplied;

b) at least the heat exchanger channel or the intended heat exchanger channels and the intended profile are incorporated into the material strips by deep drawing;

c) the forward-flow distribution apertures intended for the heat exchanger tube bundle are incorporated into a first material strip from step b), in order to obtain a first heat exchanger plate, and the return collecting apertures intended for the heat exchanger tube bundle are incorporated into a second material strip from step b), in order to obtain a second heat exchanger plate;

d) the first and the second heat exchanger plate from step c) are aligned in such a manner that the webs of the two heat exchanger plates border each other, and the heat exchanger channels form heat exchanger tubes, and the forward-flow distribution apertures and the return collecting apertures do not overlap; and e) the arranged heat exchanger plates from step d) are joined together in order to form a heat exchanger tube bundle.

The method according to the invention is very rapid and operates with a reject rate of close to 0%. Furthermore, it can readily be integrated into series production by being designed, for example, as a continuous method in which the required material strips are obtained by cutting from rolls. Furthermore, it is highly flexible with regard to the profile which is to be incorporated into the material strips by deep drawing. Said profile has to be complementary to the geometric shape of the individual cells, the use of which is planned so as to ensure that the heat exchanger tube bundle produced can fit closely against the individual cells in as readily heat-conductive a manner as possible (i.e., in particular in a form-fitting manner and/or without gaps). Suitable individual cells can have a multiplicity of geometric shapes.

However, customary electrochemical individual cells, for example of the nickel metal hydride type, have a cylindrical form, and therefore, as a profile which is complementary thereto, in particular a wavy profile has to be incorporated into the material strips in step b).

In a second embodiment of the present invention, steps b) and c) are reversed. Accordingly, the alternative method has the steps that a) two deep-drawable material strips are supplied;

b) the forward-flow distribution apertures intended for the heat exchanger tube bundle are incorporated into a first material strip, and return collecting apertures intended for the heat exchanger tube bundle are incorporated into a second material strip;

c) at least the heat exchanger channel or the intended heat exchanger channels and the intended profile are incorporated into the first material strip and the second material strip from step b) by deep drawing, in order to obtain a first and a second heat exchanger plate;

d) the first and the second heat exchanger plate from step c) are aligned in such a manner that the webs of the two heat exchanger plates border each other, and the heat exchanger channels form heat exchanger tubes, and the forward-flow distribution apertures and the return collecting apertures do not overlap; and e) the arranged heat exchanger plates from step d) are joined together in order to form a heat exchanger tube bundle.

Whereas the first embodiment, has the advantage that only one type of material strip must be handled during the deep-drawing operation (step b)), the second embodiment has the advantage that only one type of material strip has to be handled during the incorporation of the apertures (step b)). Therefore, either the first embodiment or the second embodiment may be advantageous, depending on how the material strips must be processed.

The deep-drawable material strips for step a) of the method can preferably be obtained by cutting from rolls. As a result, the method can be particularly advantageously integrated into series production.

The channels, grooves and webs provided for the heat exchanger tube bundle can all be incorporated during the deep-drawing step of the method according to the invention. As a result, further method steps which complicate and delay the method and in which channels, grooves and webs which may otherwise be required would have to be incorporated, can be spared.

Furthermore, the forward-flow distribution apertures and the return collecting apertures can be incorporated by punching, with, preferably, further unnecessary or excess material additionally being removed from the material strips. This permits a particularly simple and rapid incorporation of apertures and preferably removal of excess material.

Furthermore, the method can be simplified and accelerated even further if the deep drawing and the punching are carried out in one step.

When the heat exchanger plates are joined together in step e), it is preferred if they are joined together in such a manner that the heat exchanger tubes are sealed in relation to one another and the heat exchanger tube bundle is sealed along its circumference in relation to the surroundings at least in a manner tight to temperature-control medium, i.e., tight in relation to the temperature-control medium. It is furthermore preferred if they are sealed fluid-tightly, (i.e., in relation to liquids and gases) in order to prevent a loss of temperature-control medium during operation and an associated deterioration in the temperature control.

The heat exchanger plates are joined together in step e) preferably by pressure welding. Heating element welding is especially desirable, particularly direct heating element welding. In comparison to laser welding, these welding variants have the advantage of being less complicated and error-prone for the workpieces (heat exchanger plates) with a wavy profile which are to be welded together here. For example, they tolerate a slight deviation in the wavy heat exchanger plates by said deviations being compensated for during closing of the pressure welding mold. As a result, welding errors scarcely occur, and therefore the heat exchanger tube bundles produced have no or at least virtually no leakages. Furthermore, such welding variants permit particularly rapid joining together of the two heat exchanger plates within a few seconds (preferably less than 20 s, in particular less than 5 s), which favors cost-effective series production of the heat exchanger tube bundle according to the invention.

The method according to the invention can furthermore be improved by joining the heat exchanger plates in step e) together by fully mechanical or automatic welding. As a result, the method can be simplified and accelerated even further.

A third aspect of the present invention provides a pressure welding apparatus for carrying out the above-described method. The apparatus is designed in such a manner that all of the welding seams for joining together two heat exchanger plates to form a heat exchanger tube bundle and for sealing the heat exchanger tubes in relation to one another and for sealing the heat exchanger tube bundle along its circumference in relation to the surroundings, can be produced in a single welding operation (for short: stroke).

As a result, the pressure welding apparatus according to the invention makes it possible to perform the method according to the invention particularly rapidly and efficiently, and favors the implementation thereof in the form of cost-effective series production.

A preferred embodiment of the pressure welding apparatus according to the invention has a male welding mold or a welding punch and a female welding mold, which can be moved toward each other to close the apparatus for a welding operation. The surface of the male welding mold and the surface of the female welding mold copy the profile of that surface of a joined-together heat exchanger tube bundle which faces them in each case or copy the profile such that the male welding mold and the female welding mold fit closely against the heat exchanger tube bundle and the closed state of the pressure welding apparatus. Furthermore, the male welding mold and/or the female welding mold has or have at least one heating element in the region which, in the closed state of the pressure welding apparatus, borders the welding seams of the heat exchanger tube bundle. With a pressure welding apparatus of this type, welding seams can be produced rapidly and precisely on profiled workpieces in a thermal manner. As a result, the method according to the invention can be carried out even more rapidly and more efficiently.

In another embodiment of the pressure welding apparatus, the male welding mold has welding webs which lie opposite welding webs of the female welding mold. The welding webs follow the profile of the heat exchanger tube bundle such that they fit closely on both sides against the welding seams of the heat exchanger tube unit in the closed state of the pressure welding apparatus. With the aid of the welding webs, the welding seams provided can be produced particularly rapidly, efficiently and precisely in a single stroke.

In this case, the at least one heating element is arranged on the welding webs of the male welding mold and/or the female welding mold (i.e., it is attached or incorporated, preferably to or on the insides of the welding webs). In particular, the at least one heating element is incorporated into the welding webs along the ends of the welding webs. This further improves the rapid, efficient and precise production of the welding webs provided.

The at least one heating element is preferably a heating resistor (in particular a strip heater or a heating wire), which follows the ends of the welding webs. In this case, the heating element is preferably coated with an inert plastic, in particular with polytetrafluoroethylene (for short: PTFE, for example Teflon from DuPont), so that the welding webs can easily be separated from the joined-together heat exchanger tube bundle when the pressure welding apparatus is opened.

A further aspect of the pressure welding apparatus according to the invention provides means for aligning two heat exchanger plates which are to be joined together, with the means being arranged between the male welding mold and the female welding mold. The two heat exchanger plates to be joined together can therefore be brought automatically into the correct position and arranged or oriented in relation to each other as intended before and/or during a pressure welding operation. This permits a further acceleration and simplification of the method according to the invention and therefore promotes the implementation thereof in the form of cost-effective series production.

The aligning means preferably comprise a basic body facing the female welding mold and a pressure plate facing the male welding mold, which pressure plates can be moved toward each other to close the apparatus for a welding operation (for short: stroke), with the surface of the basic body and the surface of the pressure plate copying the profile of that surface of a heat exchanger tube bundle which faces them in each case such that the basic body and the pressure plate fit closely against the heat exchanger tube bundle in the closed state of the pressure welding apparatus. Furthermore, the basic body has slots which lie opposite slots of the pressure plate; in the closed state of the pressure welding apparatus, the webs of the male welding mold reach through the slots of the pressure plate and the webs of the female welding mold reach through the slots of the basic body. The pressure plate centers the two heat exchanger plates to be joined together on the basic body with the aid of a defined, predetermined compressive force and therefore brings about an automatic arrangement of the two heat exchanger plates in the designated position with respect to each other. As a result, the method according to the invention can be simplified and accelerated even further.

The aligning provision can furthermore comprise at least one stop strip attached to the basic body, to serve as a stop for the two heat exchanger plates to be joined together. This permits an even more rapid and more precise arrangement of the two heat exchanger plates.

A further development of the pressure welding apparatus according to the invention has means for centering the pressure plate and the basic body when the apparatus is closed. More reliable and precise closing of the pressure welding apparatus can therefore be ensured, so that the pressure welding apparatus can be closed more rapidly with its component engaging one in another, and the method according to the invention can therefore be accelerated.

In this case, the centering means preferably comprise at least one centering bolt and one centering bore which interact in such a manner that the pressure plate and basic body are guided into the intended position when the apparatus is closed.

There can preferably be four centering bolts which are attached to or formed on the basic body, arranged in the corners of the basic body, and when the apparatus is closed, engage in four centering bores incorporated into the pressure plate.

In addition, the centering bolts can be designed in the manner of a spacer such that, in the closed apparatus, a predetermined distance is provided between pressure plate and basic body, into which a heat exchanger tube bundle according to the invention fits.

A fourth feature of the present invention provides a heat exchanger tube bundle which is obtainable according to the above-described method. According to the invention, the heat exchanger tube bundle is formed from a first deep-drawn heat exchanger plate and a second deep-drawn heat exchanger plate, of which each has at least two heat exchanger channels spaced apart from one another by means of webs. The two heat exchanger plates are aligned in such a manner that the heat exchanger channels lie opposite each other and the webs border each other. As a result, the heat exchanger channels of the first heat exchanger plate together with the opposite heat exchanger channels of the second heat exchanger plate form heat exchanger tubes that are spaced apart from one another by grooves formed by the webs and the channel walls bordering them. The heat exchanger tube bundle furthermore has a profile which is shaped so that it can fit closely against the individual cells in a form-fitting manner between adjacent rows of a plurality of electrochemical storage cells (for short: individual cells) which are arranged next to one another in at least two adjacent rows.

The heat exchanger tube bundle according to the invention has no, or almost no, leakages. Furthermore, it is more flexible than heat exchanger tube bundles comprising heat exchanger plates with milled heat exchanger channels, since it has a lower material thickness in the region of the webs between the heat exchanger tubes. As a result, a lower compressive force is required to press the heat exchanger tube bundle according to the invention in a gap-free manner (i.e., as heat-conductively as possible) against the individual cells to be temperature-controlled. When the heat exchanger tube bundle according to the invention is pressed on or fitted closely, less compressive force has to be used in order to produce a readily heat-conductive contact. Thus, there is also a lower risk of cross-sectional changes to the heat exchanger tubes, which could lead to the temperature control being impaired.

In this case, a heat exchanger tube of the heat exchanger tube bundle according to the invention is formed from the bases and the walls of the mutually opposite heat exchanger channels, with the walls extending between the bases and the webs and being aligned at an angle thereto. As a result, the heat exchanger tube bundle is even more flexible and can be pressed onto the individual cells or fitted closely against them with even less compressive force and in an even better heat-conducting manner.

In a first embodiment of the invention, the angle between a wall and the base of a heat exchanger channel and between the wall and the bordering web is 90°. This gives the individual heat exchanger tubes more stability in the region of their walls such that the heat exchanger tube bundle as a whole can absorb considerable compressive forces without cross-sectional changes occurring in the heat exchanger tubes.

In an alternative second embodiment, the angle between a wall and the base of a heat exchanger channel and between the wall and the bordering web is less than 90°, preferably 45 to 89°, and particularly preferably 60 to 75°). As a result, although the heat exchanger tubes have a lower degree of stability, the heat exchanger tube bundle has instead overall a higher degree of flexibility. Therefore, less compressive force needs be applied to press or fit individual cells and heat exchanger tube bundles against one another in a readily heat-conductive manner.

It is also possible for the angle in some heat exchanger channels to be 90° and in others to be less than 90°, with it also being possible for the deviation from 90° to be variable.

The heat exchanger plates are joined together in the region of the webs and in the region of their circumference preferably, in such a manner that the heat exchanger tubes are tightly sealed to temperature-control medium, preferably fluid-tightly. In relation to one another and with respect to the surroundings of the heat exchanger tube bundle in order, during operation, to prevent a loss of temperature-control medium and an associated deterioration in the temperature control.

The heat exchanger tube bundles are preferably formed from a deep-drawable plastic which is resistant to temperature-control medium. Materials of this type have the advantage of being easily available, easily processable, generally electrically insulating, low in weight (which is of great significance in particular for mobile applications, for example in a vehicle) and high in long-term durability.

In particular, aromatic polyesters, aromatic polysulfides or aromatic polyetherketones or mixtures thereof, preferably PET-G, PPS or PEEK or mixtures thereof, particularly preferably PET-G, have proven suitable materials in this case.

A fifth aspect of the present invention is the provision of a heat exchanger module, comprising a heat exchanger tube bundle as described above. According to the invention, the heat exchanger module has one or more pairs of adjacently arranged first and second heat exchanger tubes. Each heat exchanger tube, in the input region, has a forward-flow distribution aperture which is formed in the first heat exchanger plate, and in the output region, a return collecting aperture which is formed in the second heat exchanger plate. In this case, in adjacent heat exchanger tubes, the forward-flow distribution aperture of a first heat exchanger tube is in each case arranged next to the return collecting aperture of a second heat exchanger tube, and the forward-flow distribution aperture or return collecting aperture of the first heat exchanger tube is arranged diametrically to the forward-flow distribution aperture or return collecting aperture of the second heat exchanger tube. Thus, during correct operation, there is opposite fluid flow in adjacent heat exchanger tubes (for short: counterflow principle). Furthermore, the forward-flow distribution apertures of the first heat exchanger tubes are fluidically connected to a first forward-flow distribution tube, and the forward-flow distribution apertures of the second heat exchanger tubes are fluidically connected to a second forward-flow distribution tube, and the return collecting apertures of the first heat exchanger tubes are fluidically connected to a first return collecting tube, and the return collecting apertures of the second heat exchanger tubes are fluidically connected to a second return collecting tube. In addition, the forward-flow distribution and return collecting tubes have connecting means for supplying and removing a temperature-control medium.

The heat exchanger modules according to the invention can be combined in a simple manner to form heat exchangers. They can furthermore easily be fitted closely against individual cells in a readily heat-conductive manner on account of their profile and their flexibility and, on account of the counterflow principle implemented therein, ensure efficient, reliable and uniform cooling of the individual cells.

The heat exchanger module is configured such that it can be stacked, with intermediate spaces in which individual cells can be arranged in a form-fitting manner being provided between in each case two stacked heat exchanger modules. A particularly efficient and space-saving cooling of a relatively large number of individual cells can therefore be achieved.

In one embodiment, the connecting means for supplying and removing a temperature-control medium comprise means with which the forward-flow distribution tubes of a first heat exchanger module of a heat exchanger module stack can be fluidically connected to the return collecting tubes of an adjacent second heat exchanger module, while the return collecting tubes of the first heat exchanger module can be fluidically connected to the forward-flow distribution tubes of an adjacent third heat exchanger module. The final heat exchanger modules of a stack of heat exchanger modules can furthermore have connecting branches for supplying and removing temperature-control medium, which connecting branches are preferably attached in each case to a forward-flow distribution tube and return collecting tube. Particularly efficient distribution of the temperature-control medium, and particularly uniform temperature-control of the individual cells, can therefore be achieved.

The forward-flow distribution tubes of a first heat exchanger module in a heat exchanger module stack preferably bear against the return collecting tubes of an adjacent second heat exchanger module, with the forward-flow distribution tubes of the first heat exchanger module and the return collecting tubes of the adjacent second heat exchanger module having interacting adjusting aids. The adjusting aids facilitate the stacking of the heat exchanger modules.

The interacting adjusting aids are preferably a groove-pin combination, a forward-flow distribution tube of the heat exchanger module having a groove or a pin, and one return collecting tube of the adjacent second heat exchanger module having a pin interacting with the groove or a groove interacting with the pin. The pin can be provided in the form of a spring element, and the groove and pin can be joined together in a heat exchanger module with the aid of an adhesive, in order to improve the stability of the stack.

A sixth aspect of the present invention is a heat exchanger, comprising two or more heat exchanger modules as described above. According to the invention, the forward-flow distribution tubes of a first heat exchanger module are fluidically connected to the return collecting tubes of an adjacent second heat exchanger module and, if there are three or more heat exchanger modules, the return collecting tubes of the first heat exchanger module are fluidically connected to the forward-flow distribution tubes of an adjacent third heat exchanger module. Two of the heat exchanger modules are arranged at the ends and each close the stack, and therefore have only one adjacent heat exchanger module. The final heat exchanger modules have connecting means, which are designed as connecting branches or connecting flanges, for supplying and removing a temperature-control medium. The connecting means are each attached to a final forward-flow distribution tube or return collecting tube. Furthermore, intermediate spaces for receiving electrochemical storage cells (for short: individual cells) are provided between the heat exchanger tube bundles of adjacent heat exchanger modules.

Due to flexibility and the counterflow principle implemented therein, the heat exchangers according to the invention permit efficient, reliable and uniform cooling of the individual cells. Furthermore, they have a low weight, which is of great advantage in particular for mobile applications.

A seventh aspect of the present invention provides an electrochemical energy accumulator, comprising a heat exchanger as described above, which has two or more heat exchanger tube bundles as described above, and two or more electrochemical storage cells (for short: individual cells) which are arranged in a form-fitting manner in intermediate spaces between the two or more heat exchanger tube bundles. The individual cells are connected electrically in series by means of pole connectors, which are fastened to the individual cells by pole connector screws. According to the invention, the pole connector screws are supported by at least one disk spring, preferably by three disk springs.

During normal operation, the electrochemical energy accumulator according to the invention reliably supplies electric energy (even despite multiple vibrations and impacts), since the pole connector screws supported by disk springs do not work loose, even in the event of vibrations and impacts, but rather remain firmly seated and reliably maintain the electric contact.

An eighth aspect of the present invention is the use of the electrochemical energy accumulator as described above for the on-board power supply of a vehicle and/or for the power supply to a driving device of a vehicle.

The use according to the invention is therefore particularly advantageous because the electrochemical energy accumulator can easily be adapted to a wide spectrum of power requirements, for example by adding or taking away heat exchanger modules. Furthermore, it has a low weight and is insensitive to impacts and vibrations as customarily occur in the case of vehicles.

The vehicle can be in particular a road vehicle (passenger vehicle, truck, utility vehicles, tractor, coaches or the like) which have one or more types of drive (hybrid drive), of which one comprises an electric drive. Electric drives of this type require a high degree of power and dynamics and therefore efficient temperature control of the individual cells of its electrochemical energy accumulator, which can be ensured with the present invention.

Other objects, advantages and novel features of the present invention will become apparent from the following detailed description of the invention when considered in conjunction with the accompanying drawings.

BRIEF DESCRIPTION OF THE DRAWINGS

Specific exemplary embodiments of the invention are illustrated in simplified form in the figures and are explained in more detail in the description below, wherein the same reference numbers refer to identical, functionally identical or similar components. In the figures, in each case schematically:

FIG. 4 shows a section through a heat exchanger plate according to the invention;

FIG. 5 shows a section through a heat exchanger tube bundle according to the invention;

Only the features required for understanding the invention are denoted.

DETAILED DESCRIPTION OF THE DRAWINGS

Figure 1:
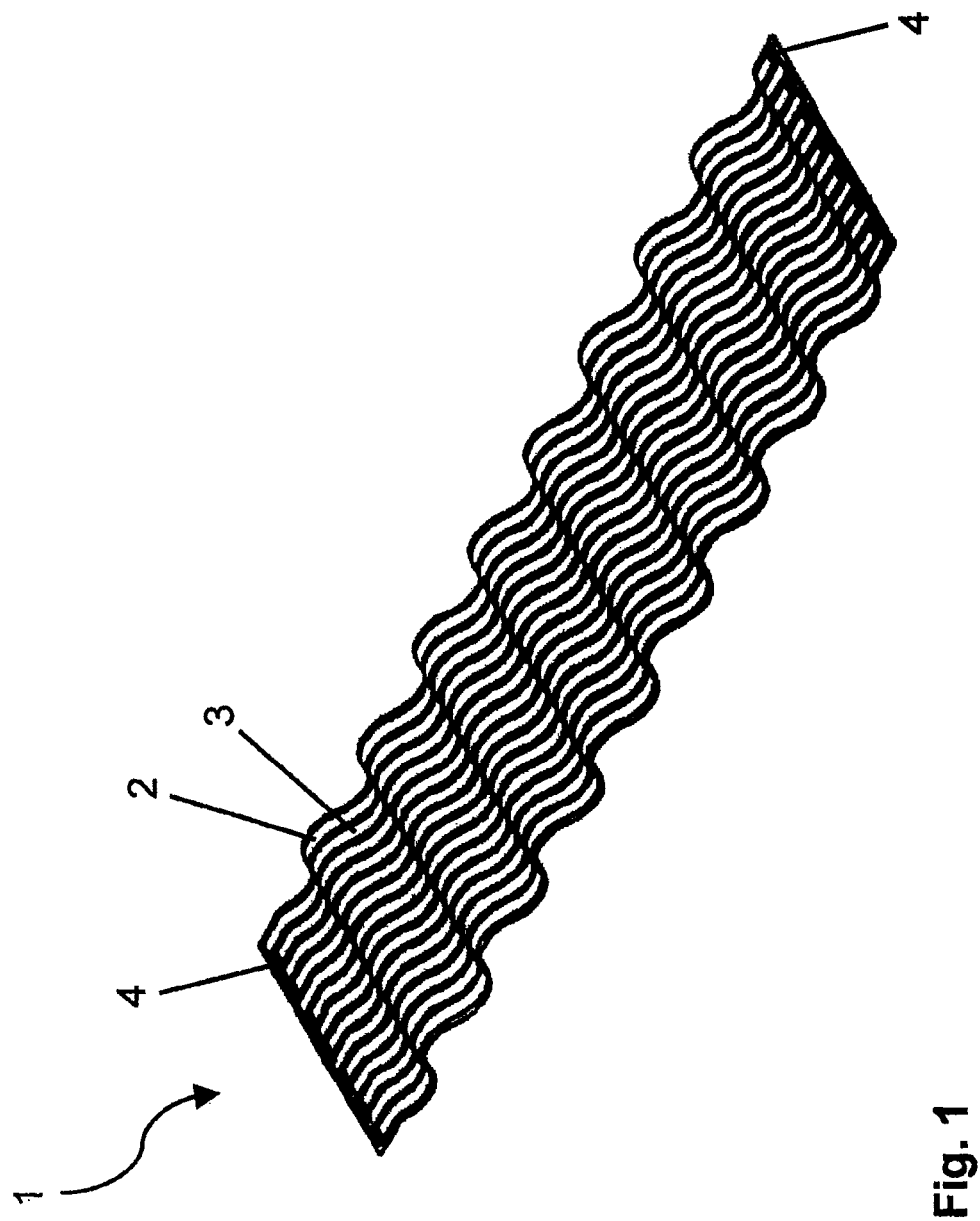
FIG. 1 shows a heat exchanger plate according to the invention.

FIG. 1 shows a perspective illustration of a first heat exchanger plate (1) made from PET-G. The latter is particularly suitable for the present invention, since it is fracture-proof, can readily be bent and deep drawn, can be adhesively bonded, can be welded, is resistant to glycol and does not absorb any water (i.e., it does not swell). The heat exchanger plate (1) has a wavy profile which is suitable for fitting closely against a row of cylindrical individual cells (not illustrated) in a form-fitting manner. Furthermore, the heat exchanger plate has 14 heat exchanger channels (2, 3) which are incorporated during the deep-drawing operation, are parallel to one another and of which only two, as representative of all of them, are provided with a reference number, for the sake of clarity. The heat exchanger channels (2, 3) each have an aperture (4, 4') punched into them at one longitudinal end, the apertures (4, 4') being located at diametric ends in the case of a pair of adjacent heat exchanger channels (2, 3). This arrangement of the apertures (4, 4') makes possible the counterflow principle (described below). The apertures (4, 4') of a heat exchanger plate (1) serve here either as forward-flow distribution apertures or as return collecting apertures.

Figure 2:
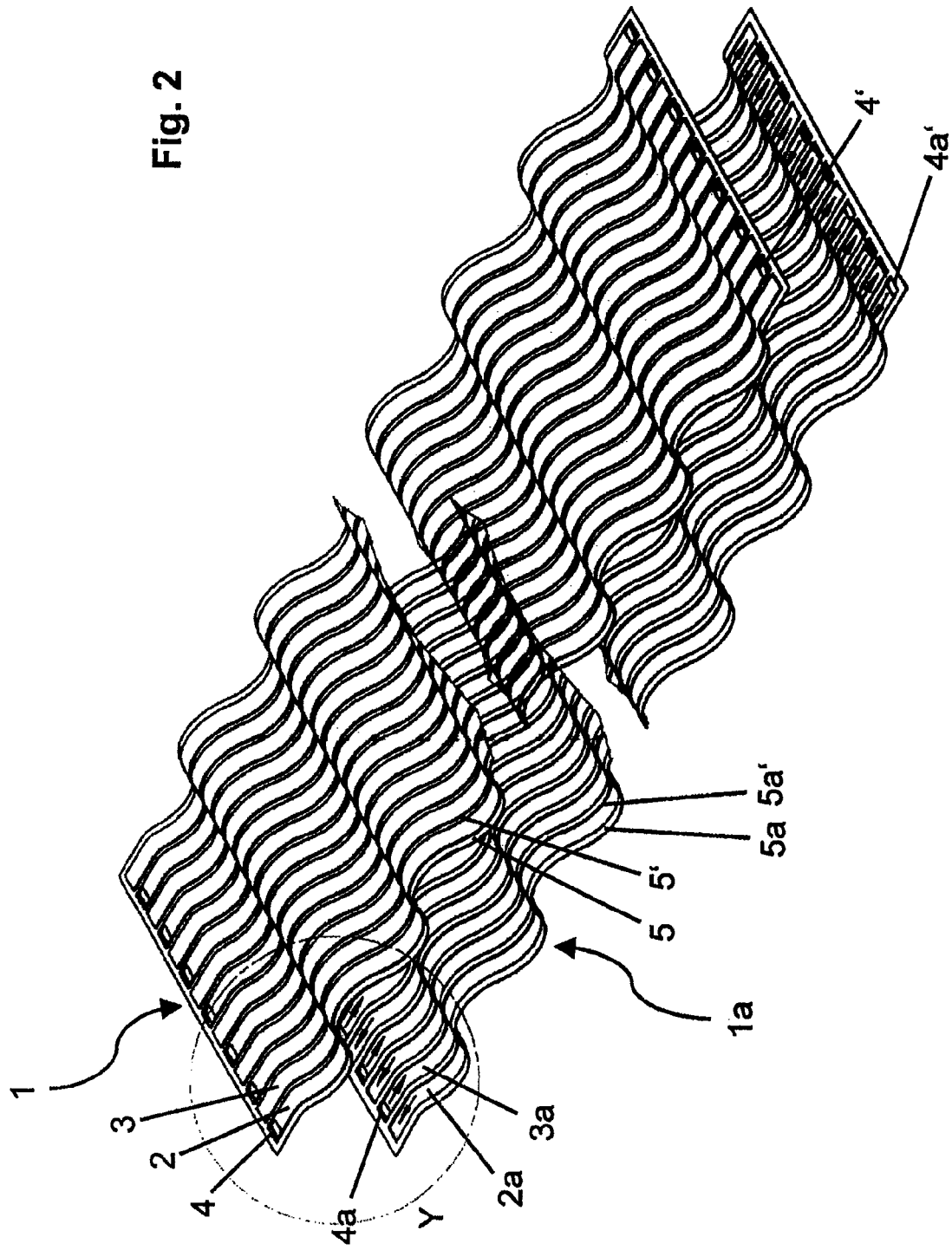
FIG. 2 shows two heat exchanger plates according to the invention arranged one above the other.

FIG. 2 is a perspective illustration of two heat exchanger plates (1, 1a) arranged one above the other. For illustrative reasons, in each case only the left and the right ends are illustrated; a central part has been omitted in each case, which is indicated by the interruption in the heat exchanger plates (1, 1a) in the region of the center. The upper heat exchanger plate (1) is not congruent with the lower plate (1a); that is, the two heat exchanger plates (1, 1a) cannot be transformed into each other by any symmetry operation. Thus, although the profiles of the two heat exchanger plates (1, 1a) are identical, the arrangement of the apertures (4, 4'; 4a, 4a') is offset. The upper heat exchanger plate (1a) thus has return collecting apertures (4, 4') and the lower heat exchanger plate (1a) has forward-flow distribution apertures (4a, 4a'). (For the sake of clarity, and as representative of all of them, in each case only two diametric apertures (4, 4'; 4a, 4a') of a heat exchanger channel pair (2, 3) of a heat exchanger plate (1, 1a) are provided with reference numbers.)

This is clarified by the arrows which are drawn in the heat exchanger channels (2a, 3a) and show the intended direction of flow of a temperature-control medium during correct operation. Accordingly, the temperature-control medium enters the heat exchanger tubes through the forward-flow distribution apertures (4a, 4a') and exits from the heat exchanger tubes through the return collecting apertures (4, 4') such that the temperature-control medium flows in the opposite direction in adjacent heat exchanger tubes (counterflow principle). (This is illustrated once again on an enlarged scale in the cutout denoted by (Y), cf. FIG. 3.)

When the two heat exchanger plates (1, 1a) are drawn together to form a heat exchanger tube bundle, the heat exchanger tubes are produced from the mutually opposite heat exchanger channels (2) and (2a) and also (3) and (3a). The joining together takes place first of all by placing the heat exchanger plates (1, 1a) one inside another, in such a manner that, in each case, the heat exchanger channels (2) and (2a) come to overlap as do the heat exchanger channels (3) and (3a), with the webs (5, 5') and (5a, 5a') bounding the heat exchanger channels bordering one another. The two heat exchanger plates (1, 1a) are then joined together along the webs (5, 5a; 5', 5a') and along their circumference, in a manner that is tight to temperature-control medium, by means of pressure welding. The longitudinal direction of a heat exchanger tube bundle runs in or counter to the designated directions of flow in the heat exchanger tubes, as clarified by the arrows.

The temperature-control medium used is a glycol in water solution which, depending on requirements (e.g. with regard to the freezing point), can have a glycol concentration of differing amounts.

Figure 3:
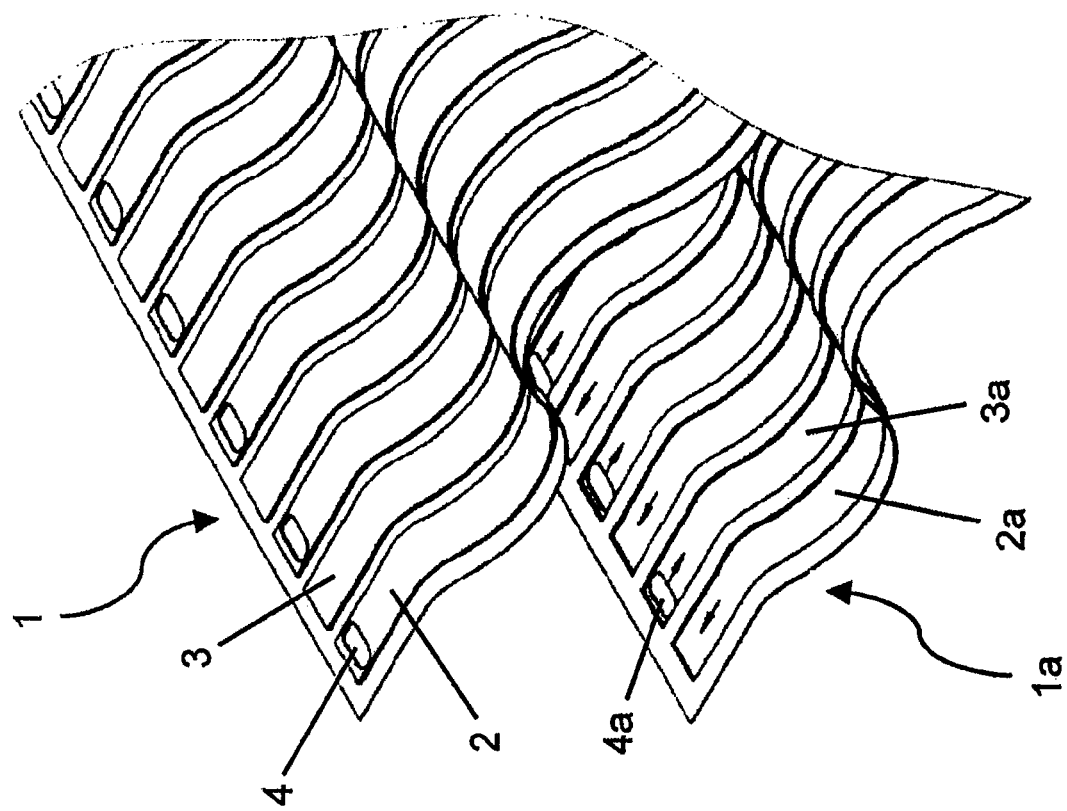
FIG. 3 shows a detail from FIG. 2.

FIG. 3 shows the cutout (Y) from FIG. 2 in an enlarged and clarified form. Cutouts of the upper heat exchanger plate (1), with six return collecting apertures (4), and of the lower heat exchanger plate (1a), with three forward-flow distribution apertures (4a), can be seen. The arrows in the heat exchanger channels (2a, 3a) of the lower heat exchanger plate (1a) clarify the flow in the heat exchanger tubes which, after the two heat exchanger plates (1, 1a) are joined together to form a heat exchanger tube bundle, are formed from the heat exchanger channels (2) and (2a) and also (3) and (3a), which flow is provided for correct operation: in the input region away from the forward-flow distribution apertures (4a) and toward the return collecting apertures (4) in the output region such that an anti-parallel flow arises in adjacent heat exchanger tubes (counterflow principle).

FIG. 4 shows a section through the lower heat exchanger plate (1a) according to FIG. 2, perpendicularly to the longitudinal direction thereof. Fourteen heat exchanger channels (2a, 3a) are seen, of which, for the sake of clarity, only two as representative for all of them are provided with reference numbers. The heat exchanger channels (2a, 3a) have been incorporated into the heat exchanger plate (1a) by deep drawing and are bounded and spaced apart from one another by means of webs (5a, 5a'), of which, for the sake of clarity, only two as representative of all of them are provided with reference numbers.

FIG. 5 shows a section analogous to FIG. 4, but through a heat exchanger tube bundle (6) according to the invention which has been produced by joining together an upper heat exchanger plate (1) and a lower heat exchanger plate (1a). The heat exchanger channels (2a) and (3a) together with the heat exchanger channels (2) and (3) lying opposite them form the heat exchanger tubes (7, 8). The heat exchanger tubes (7, 8) are spaced apart from each other by means of grooves which are formed by the webs (5') and (5a'). One heat exchanger tube here is formed by the channel bases (9, 9a) and the channel walls (10, 10'; 10a, 10a'). In the refinement illustrated, the angle between the channel base (9) and the channel walls (10, 10') and between the channel base (9a) and the channel walls (10a, 10a') is 90°. As a result, compressive forces (illustrated by the two anti-parallel arrows printed in bold) can easily be absorbed by the channel walls (10, 10a) and (10', 10a'), and the heat exchanger tube bundle (6) obtains a higher degree of stability than if the angle were <90°. Nevertheless, it is preferred that such angle is <90°, since the heat exchanger tube bundle (6) is then more flexible and can fit closely against individual cells more easily (i.e., with lower compressive forces). It is also conceivable in this case for such angles in a heat exchanger tube bundle to sometimes be 90° and sometimes differ from 90° (preferably between 45 and 89° and in particular between 60 and 75°), with it also being possible for the sizes of the deviations from 90° to be variable, depending on which region of the heat exchanger tube bundle (6) requires which extent of stability and/or flexibility. This permits a heat exchanger tube bundle (6) which is tailored with regard to flexibility and stability to be produced.

Figure 6:
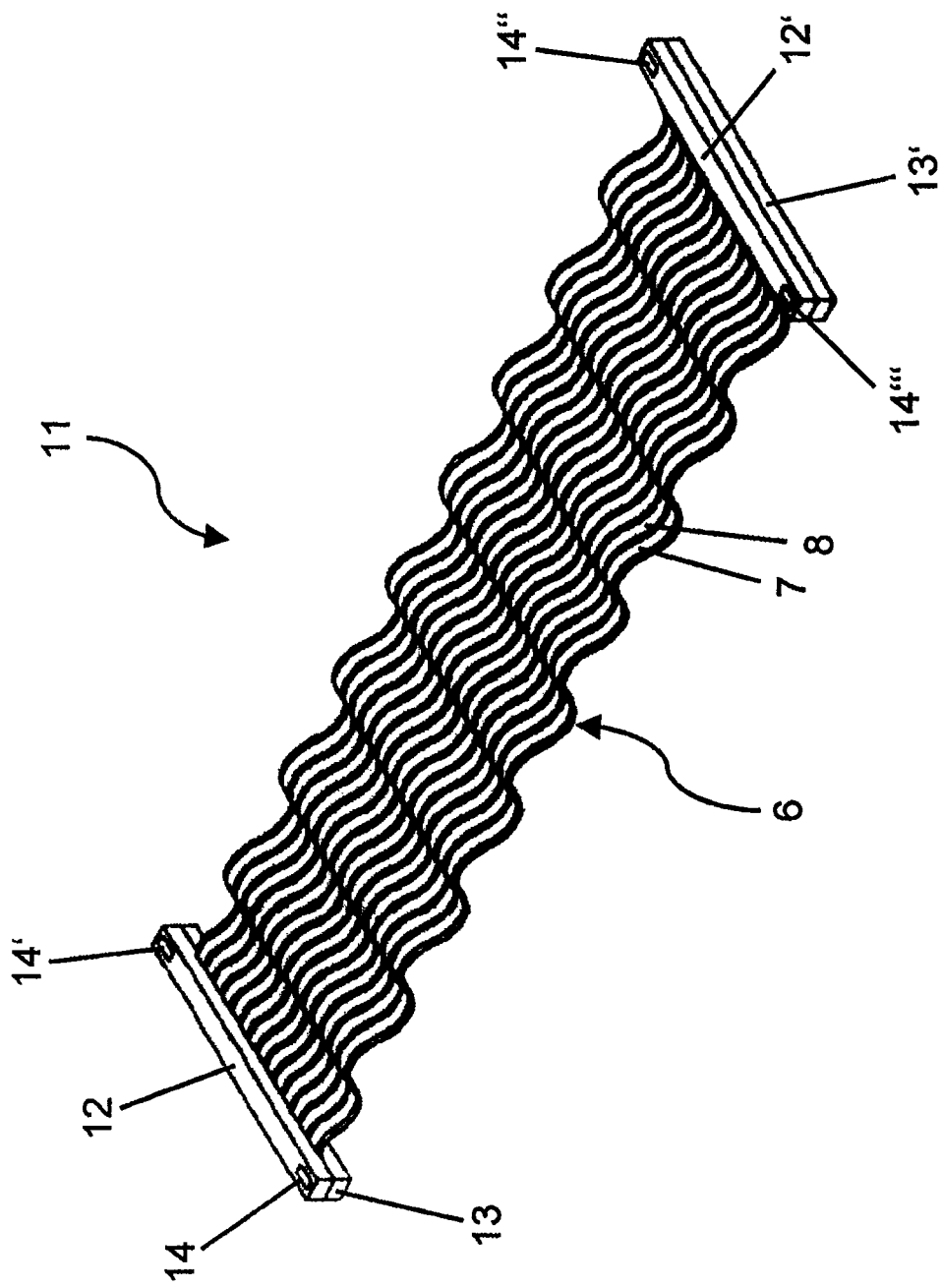
FIG. 6 shows a heat exchanger module according to the invention.

FIG. 6 shows a heat exchanger module (11) according to the invention. It comprises a heat exchanger tube bundle (6) with fourteen heat exchanger tubes (7, 8), i.e. seven pairs of adjacently arranged first heat exchanger tubes (7) and second heat exchanger tubes (8) (of the latter, for the sake of clarity and as representative of all of them, only two are provided with reference numbers), and also two return collecting tubes (12, 12') and two forward-flow distribution tubes (13, 13'). The return collecting tubes (12, 12') are fluidically connected to the return collecting apertures (concealed by the return collecting tubes) and collect the temperature-control medium emerging from the heat exchanger tubes (7, 8). Analogously, the forward-flow distribution tubes (13, 13') are fluidically connected to the forward-flow distribution apertures (concealed by the forward-flow distribution tubes) and distribute the temperature-control medium to the heat exchanger tubes (7, 8). The return collecting tubes (12, 12') have connecting means for removing a temperature-control medium. The connecting means are configured as apertures (14, 14', 14", 14''') in each case at the two longitudinal ends of the return collecting tubes (12, 12'). In an analogous manner, the forward-flow distribution tubes (13, 13') likewise have apertures which act as connecting means for supplying a temperature-control medium (not illustrated). The heat exchanger module (6) is designed in such a manner that it can be stacked, with adjacent heat exchanger modules (6) of a stack being fluidically connectable to each other via the supply and removal connecting means, in such a manner that the temperature-control medium removed from one heat exchanger module (6) can be supplied to an adjacent heat exchanger module (6).

The heat exchanger modules (6) can have adjusting aids (not illustrated), which assist in the correct stacking of the heat exchanger modules (6).

Figure 7:
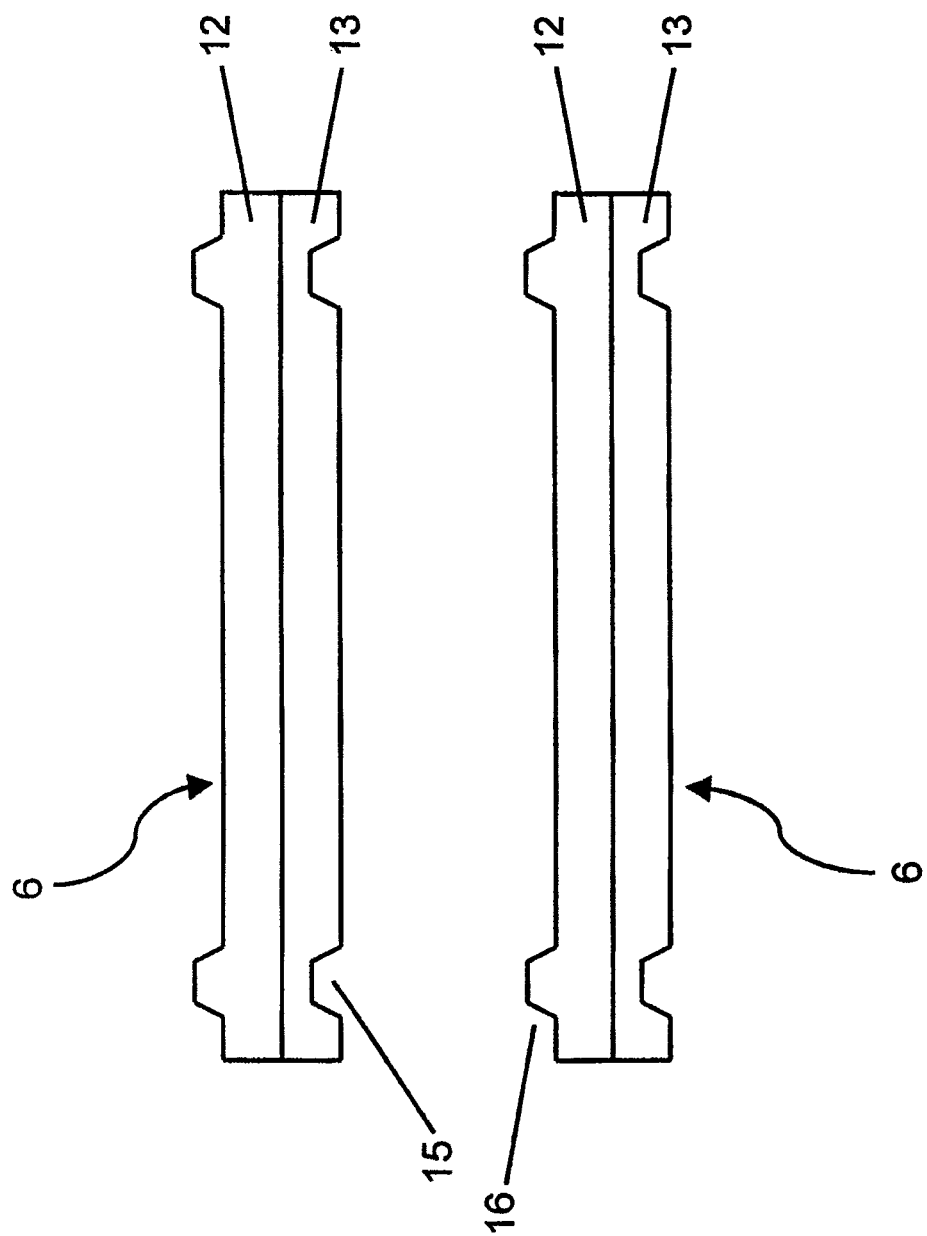
FIG. 7 shows a top view of the end side of a heat exchanger module according to the invention.

FIG. 7 shows a top view of the ends of two heat exchanger modules (6) according to the invention which, provided for stacking, are arranged one above the other. A respective return collecting tube (12) and a forward-flow distribution tube (13) can be seen in both heat exchanger modules (6). The forward-flow distribution tubes (13) have grooves (15), of which, for the sake of clarity and as representative of all of them, only one is provided with a reference number. The return collecting tubes (12) have pins (16), of which, for the sake of clarity and as representative of all of them, only one is provided with a reference number. Grooves (15) and pins (16) are designed in such a manner that they interact for the stacking, and assist in guiding adjacent heat exchanger modules (6) into the designated position and in holding them therein, for example by latching. The pins (16) can also be designed as spring elements. Furthermore, the pins (16) and the grooves (15) can also be joined together with the aid of an adhesive.

Figure 8:
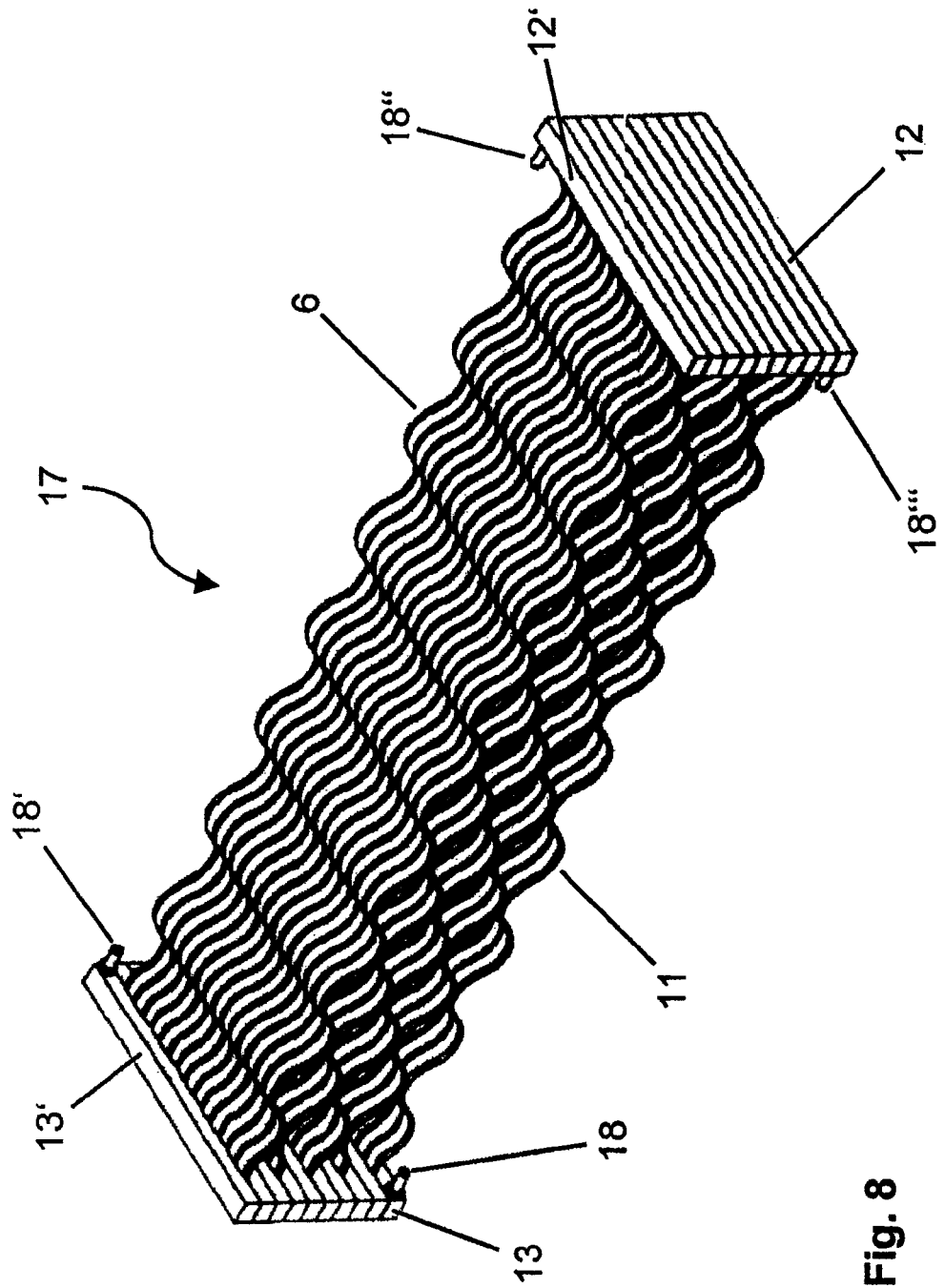
FIG. 8 shows a heat exchanger according to the invention.

FIG. 8 shows a perspective view of a heat exchanger (17) according to the invention. In the heat exchanger (17), a total of five heat exchanger modules (11) are stacked in alignment one above another. (For the sake of clarity and as representative of all of them, only one is provided with a reference number.) As described in FIG. 6, the heat exchanger modules (11) are fluidically connected to one another. The final heat exchanger modules (11) have connecting means for supplying and removing a temperature-control medium. The connecting means form connecting branches (18, 18', 18", 18'''), and are attached to the final forward-flow distribution tubes (13, 13') and return collecting tubes (12, 12'). Depending on requirements, forward-flow feed lines or return removal lines can be connected (not illustrated) to the connecting branches (18, 18', 18", 18'''). The heat exchanger tube bundles (6) of the five heat exchanger modules (11) form four rows of cylindrical intermediate spaces into which cylindrical individual cells can be fitted (not illustrated) in a form-fitting manner for controlling the temperature (i.e., cooling or heating). In this case, it is provided that the counterflow principle is complied with not only in adjacent heat exchanger tubes of a heat exchanger tube bundle (6) but also in adjacent heat exchanger tube bundles (6). Thus, during normal operation of the heat exchanger (17), the temperature-control medium flows in opposite directions in an alternating manner on all levels, such that there are alternating different temperature-control-medium flows in all directions in all of the heat exchanger channels bearing against an individual cell pushed into an intermediate space of the heat exchanger (17).

Figure 9:
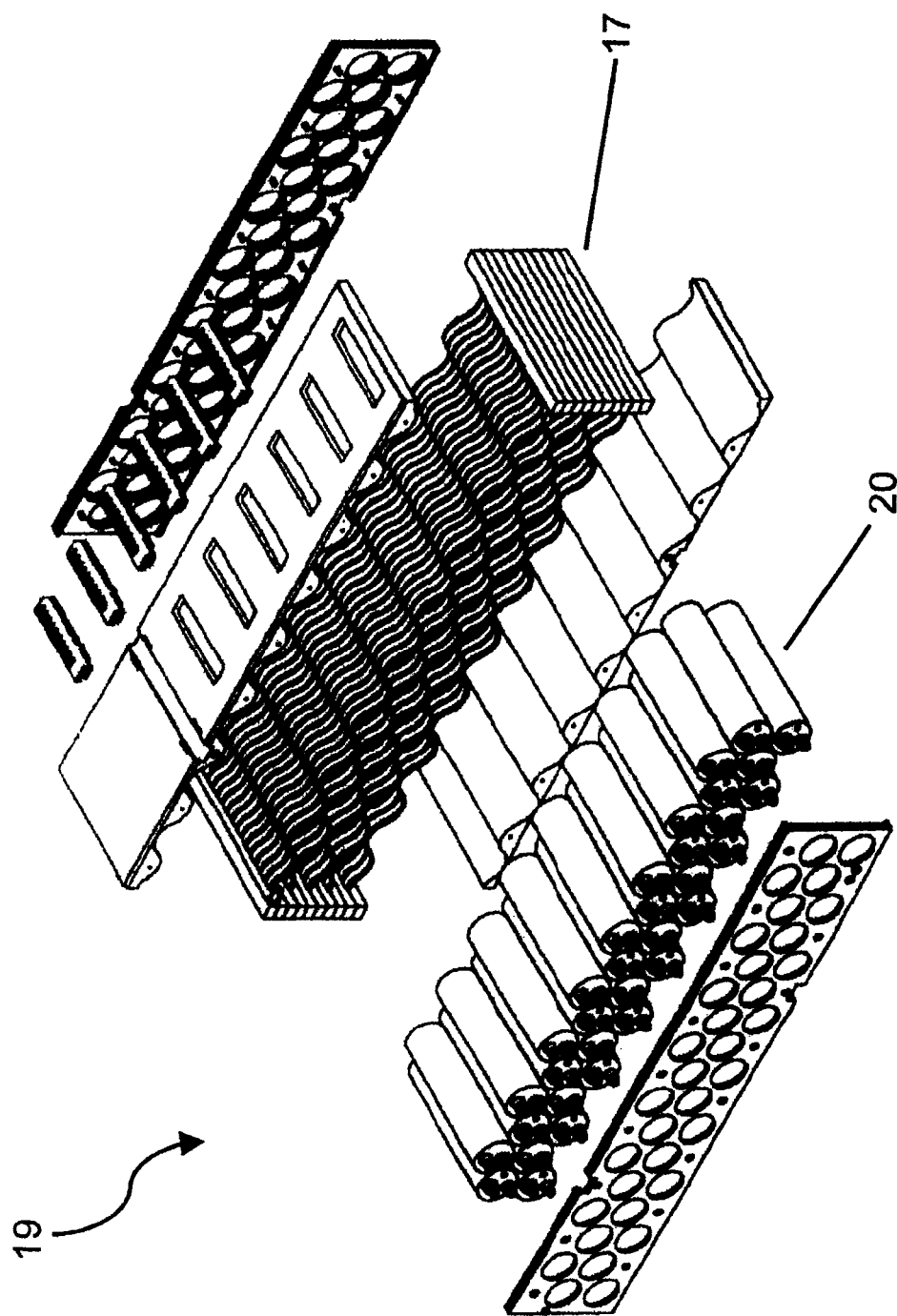
FIG. 9 shows an exploded illustration of an electrochemical energy accumulator according to the invention.

FIG. 9 shows, in an exploded illustration, an electrochemical energy accumulator (19) according to the invention with a heat exchanger (17) according to the invention (FIG. 8), four adjacent rows of a total of thirty four individual cells (20) (of which, for the sake of clarity and as representative of all of them, only one is provided with a reference number), and further components for a housing (which components are not discussed in more detail since they lack significance for the present invention).

Figure 10:
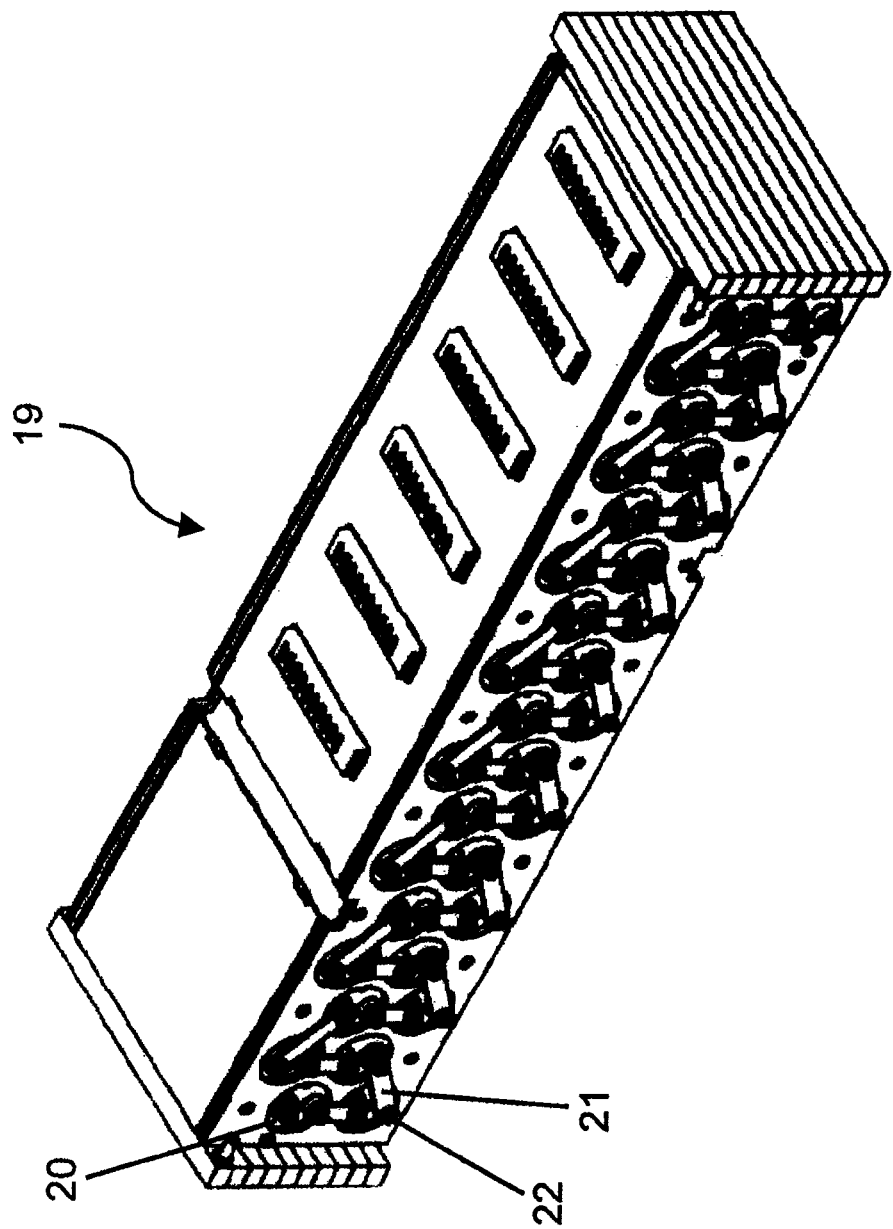
FIG. 10 shows an electrochemical energy accumulator according to the invention with pole connectors and pole connector screws.

FIG. 10 shows the electrochemical energy accumulator (19) according to FIG. 9 in an assembled state. Furthermore, the electric series connection of the thirty four individual cells (20) can be seen. For this purpose, use is made of thirty three electrically conductive pole connectors (21), of which, as representative of all of them, only one is provided with a reference number. The pole connectors (21) are fastened by pole connector screws (22) (of which, as representative of all of them, only one is provided with a reference number) to the individual cells (more precisely: to the poles of the individual cells).

Figure 11:
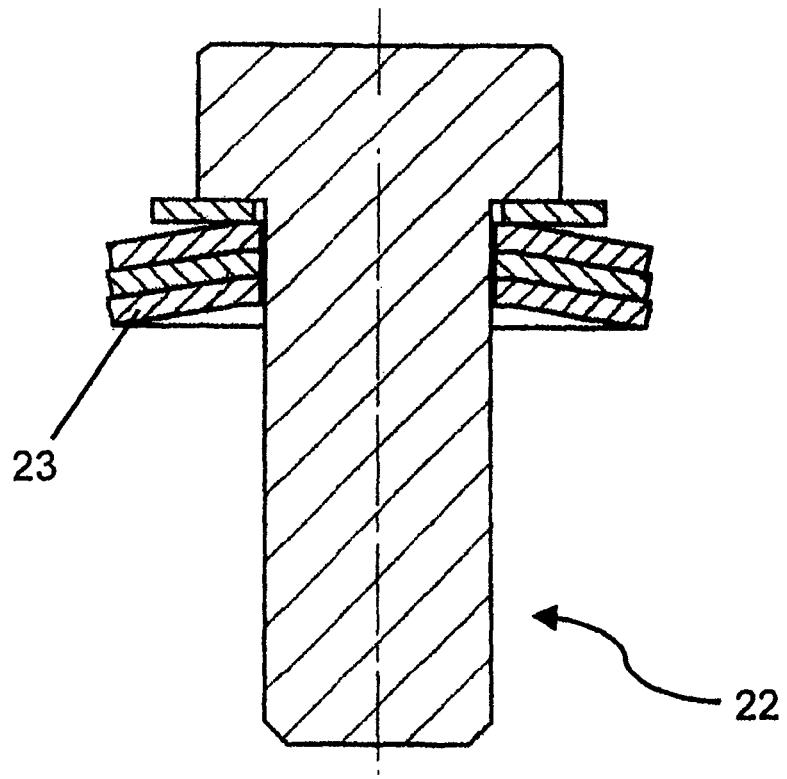
FIG. 11 shows a pole connector screw for an electrochemical energy accumulator according to the invention.

FIG. 11 shows a pole connector screw (22) in detail. A cross section is illustrated. The pole connector screw (22) is supported by three disk springs (23). This brings about a shakeproof screw connection. That is, a firm fit of the pole connector screw (22) is maintained even after a multiplicity of impacts and vibrations, such that the electric contact between the individual cells, and even in the event of rough conditions of use of the electrochemical energy accumulator, for example on-board a vehicle, and the efficiency thereof is ensured.

Figure 12:
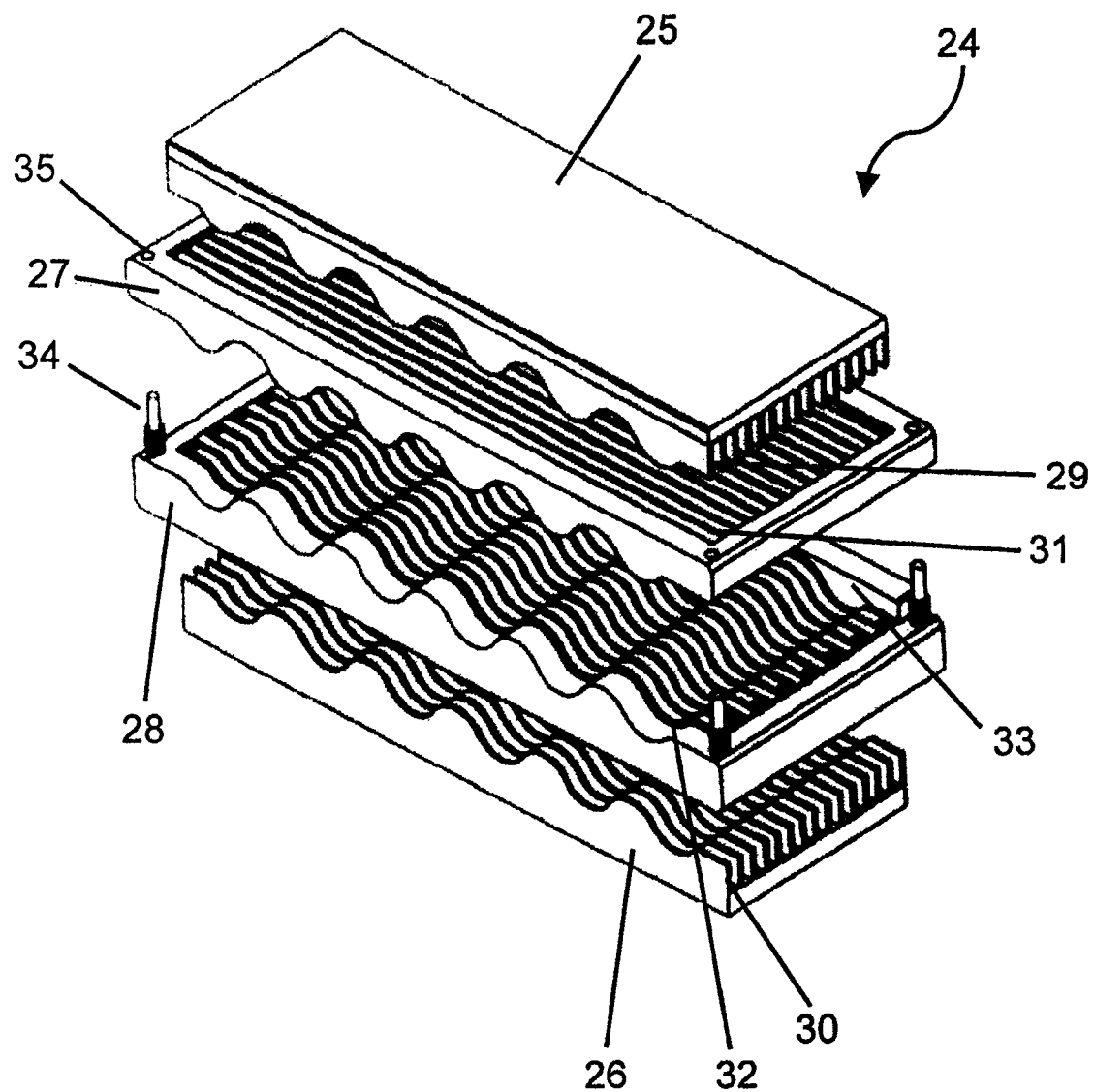
FIG. 12 shows a cutout from a pressure welding apparatus according to the invention in the open state.

FIG. 12 shows part of a pressure welding apparatus (24) according to the invention in the open state, with which two heat exchanger plates can be joined together to form a heat exchanger tube bundle according to the invention. For this purpose, the pressure welding apparatus (24) has a male welding mold (25) and a female welding mold (26) and also a pressure plate (27) and a basic body (28) which are arranged between the male welding mold (25) and the female welding mold (26). The male welding mold (25) and female welding mold (26) each have fifteen welding webs (29, 30), of which, for the sake of clarity and as representative of all of them, only two are provided with reference numbers. The welding webs (29) of the male welding mold (25) are arranged opposite the welding webs (30) of the female welding mold (26), and are provided in order, in the closed state of the pressure welding apparatus (24), to surround a designated welding seam on both sides. Strip heaters are incorporated along the mutually facing ends of the welding webs (29, 30), and are coated with Teflon so that they readily become detached (not illustrated) from the processed workpiece, the heat exchanger tube bundle produced, after a welding operation.

The pressure plate (27) and the basic body (28) each have slots (31, 32) which are complementary to the welding webs (29, 30) and through which the welding webs (29, 30) reach in the closed state of the pressure welding apparatus (24). The basic body (28) furthermore has a stop strip (33) with the aid of which the heat exchanger plates which are to be welded can be aligned when placed into the apparatus, (i.e., brought into the designated position). Furthermore, the basic body (28) has four centering bolts (34) which are attached to its corners and of which, for the sake of clarity and as representative of all of them, only one is provided with a reference number. When the apparatus is closed, the centering bolts (34) reach into complementary centering bores (35), of which, for the sake of clarity and as representative of all of them, only one is provided with a reference number, in the pressure plate (27) and thus assist the precise centering of basic body (28) and pressure plate (27).

Furthermore, the centering bolts (34) have for this purpose two sections with a different diameter: a first section with a diameter complementary to the diameter of the complementary centering bore (35) such that the first section can engage in the complementary centering bore (35); and a second section with a larger diameter. As a result, the centering bolts (34) also act as spacers which ensure that, in the closed state of the apparatus, a distance into which a heat exchanger tube bundle fits remains between basic body (28) and pressure plate (27) such that basic body (28) and pressure plate (27) fit closely on both sides against an inserted heat exchanger tube bundle and do not crush the heat exchanger tube bundle, in particular the heat exchanger tubes thereof. Furthermore, the pressure welding apparatus (24) is designed in such a manner that all of the welding seams required can be produced in a single stroke.

The pressure welding apparatus according to the invention has further components which cannot contribute anything essential to the invention and which are known in principle to a person skilled in the art. For the sake of clarity, they are therefore not illustrated or are illustrated in more detail.

Figure 13:
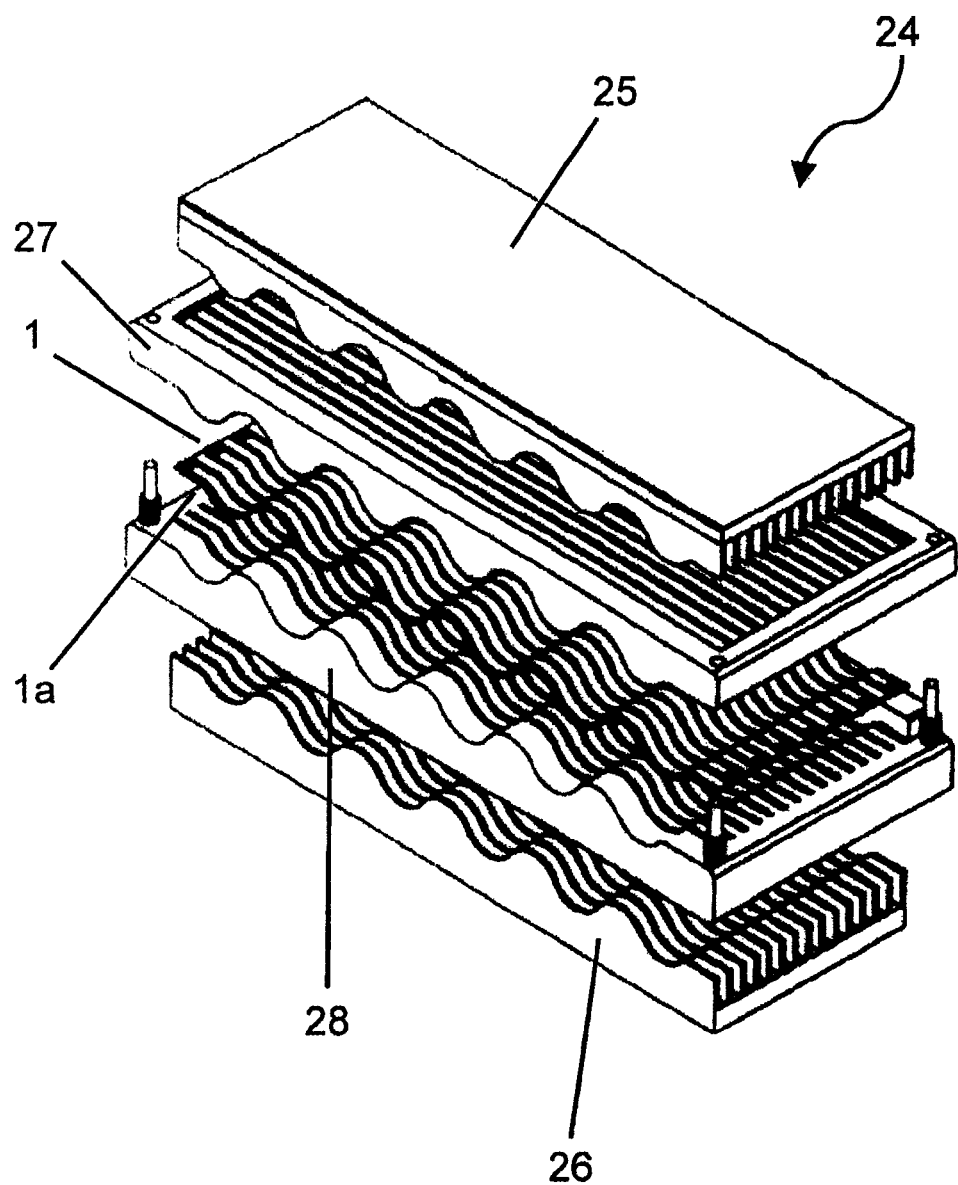
FIG. 13 shows a pressure welding apparatus according to FIG. 12 with heat exchanger plates inserted.

FIG. 13 shows the pressure welding apparatus (24) from FIG. 12 with inserted heat exchanger plates (1, 1a) which are to be welded. It can be seen that the surfaces of the four components (25, 26, 27, 28) replicate the profile of that surface of the inserted heat exchanger plates (1, 1a) which faces them in each case.

Figure 14:
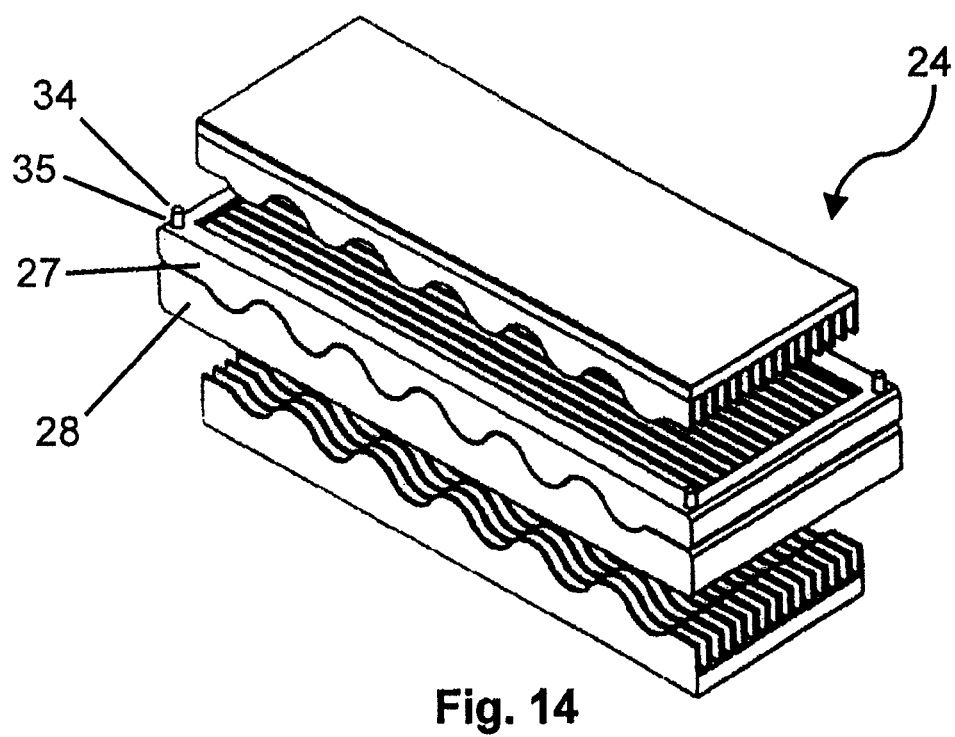
FIG. 14 shows a pressure welding apparatus according to FIG. 12 in a first phase of the closing.

FIG. 14 shows the pressure welding apparatus (24) from FIG. 13, wherein, in a first phase of the closing of the apparatus, the basic body (28) and the pressure plate (27) have been moved toward each other and closed. It can be seen that the centering bolts (34) reach through the centering bores (35). By the closing of the basic body (28) and the pressure plate (27), the inserted heat exchanger pressure plates which are to be welded are guided into the designated position and orientation for the actual pressure welding step (i.e., the production of the welding seams), and fixed therein.

Figure 15:
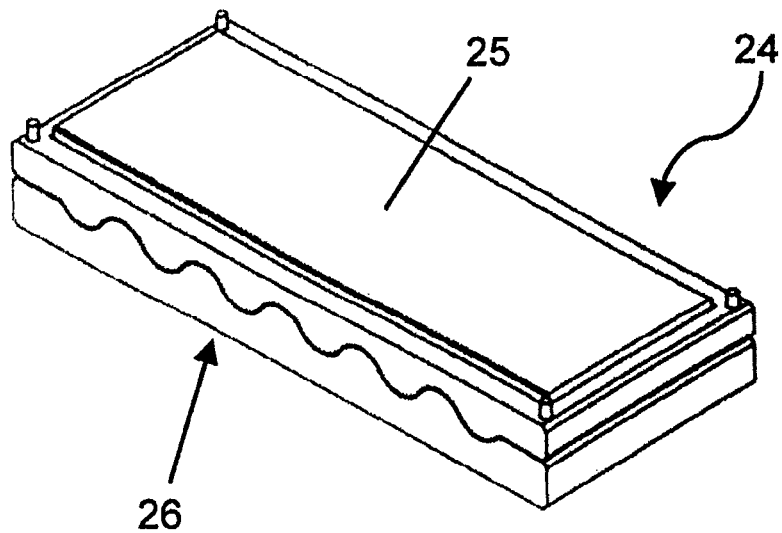
FIG. 15 shows a pressure welding apparatus according to FIG. 12 in a second phase of the closing.

FIG. 15 shows the pressure welding apparatus (24) from FIG. 14, wherein, in a second phase of the closing of the apparatus, the male welding mold (25) and the female welding mold (26) (concealed) have been moved toward each other and closed. In this closed state, those regions of the heat exchanger plates (1, 1a) which are to be welded are treated with pressure and heat in order to produce the intended welding seams. Both pressure and heat are transmitted via the welding webs of the female welding mold (25) and the male welding mold (26), by mutually opposite welding webs of the female welding mold (25) and of the male welding mold (26) (cf. FIG. 12) on both sides compressing the regions which are to be welded and heating them with the aid of the strip heaters incorporated in them.

A welding operation with insertion and alignment of the workpieces (1, 1a), closing of the pressure welding apparatus (24), production of all of the welding seams required, opening of the pressure welding apparatus (24) and ejection of the semi-finished product (6) produced (for short: stroke) lasts between 1 and 20 seconds, preferably 1 to 5 seconds, and is therefore readily suitable for integration into series production.

It is of course apparent that the features mentioned above can be used not only in the respectively stated combination but also in different combinations or on their own without departing from the scope of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Heat exchanger plate
1a Heat exchanger plate
2, 3 Heat exchanger channel
2a, 3a Heat exchanger channel
4, 4' Aperture, return collecting aperture
4a, 4a' Forward-flow distribution aperture
5, 5' Web which bounds a heat exchanger channel
5a, 5a' Web which bounds a heat exchanger channel
6 Heat exchanger tube bundle
7 Heat exchanger tube
8 Heat exchanger tube
9, 9a Channel base
10, 10a Channel wall
10', 10a' Channel wall
11 Heat exchanger module
12, 12' Return collecting tube
13, 13' Forward-flow distribution tube
14, 14' Apertures for removing a temperature-
14", 14'" control medium
15 Groove
16 Pin
17 Heat exchanger
18, 18', Connecting branch for supplying or
18", 18'" removing a temperature-control medium
19 Electrochemical energy accumulator
20 Individual electrochemical storage cell (for short: individual cell)
21 Pole connector
22 Pole connector screw
23 Disk spring
24 Pressure welding apparatus
25 Male welding mold
26 Female welding mold
27 Pressure plate
28 Basic body
29, 30 Welding web
31, 32 Slot
33 Stop strip
34 Centering bolt
35 Centering bore

The invention claimed is:

1. A method for producing a heat exchanger tube bundle for heat exchangers of electrochemical energy accumulators, in which a plurality of individual electrochemical storage cells are arranged next to one another in at least two adjacent rows, said method comprising:
   a) providing two deep-drawable material strips;
   b) incorporating at least one heat exchanger channel and a desired profile into the material strips by deep drawing;
   c) incorporating forward-flow distribution apertures for the heat exchanger tube bundle into a first material strip from step b), to form a first heat exchanger plate, and incorporating return collecting apertures for the heat exchanger tube bundle into a second material strip from step b), to form a second heat exchanger plate;
   d) aligning the first and the second heat exchanger plates formed in step c) in such a manner that i) webs of the two heat exchanger plates border each other, ii) the heat exchanger channels form heat exchanger tubes, and iii) the forward-flow distribution apertures and the return collecting apertures do not overlap; and
   e) joining together the heat exchanger plates as arranged in step d), to form the heat exchanger tube wherein the heat exchanger tubes span substantially an entire length of the heat exchanger plates in a longest dimension of the heat exchanger plates.

2. The method as claimed in claim 1, wherein all of the channels, grooves and webs provided for the heat exchanger tube bundle are incorporated during the deep-drawing step.

3. The method as claimed in claim 1, wherein:
   the forward-flow distribution apertures and the return collecting apertures are incorporated by punching; and
   excess material is removed.

4. The method as claimed in claim 3, wherein the deep drawing and the punching are carried out in a single step.

5. The method as claimed in claim 1, wherein:
   the heat exchanger plates in step e) are joined together in such a manner that the heat exchanger tubes are sealed in relation to one another; and
   the heat exchanger tube bundle is sealed along its circumference in relation to the surroundings, at least in a manner tight to temperature-control medium.

6. The method as claimed in claim 1, wherein the heat exchanger plates are joined together in step e) by pressure welding.

7. The method as claimed in claim 6, wherein the heat exchanger plates are joined together in step e) by fully mechanical or automatic welding.

8. A method for producing a heat exchanger tube bundle for heat exchangers of electrochemical energy accumulators, in which a plurality of individual electrochemical storage cells are arranged next to one another in at least two adjacent rows, said method comprising:
   a) providing two deep-drawable material strips;
   b) incorporating forward-flow distribution apertures for the heat exchanger tube bundle into a first material strip, and incorporating return collecting apertures for the heat exchanger tube bundle into a second material strip;
   c) incorporating at least one heat exchanger channel and a desired profile into the first and second material strips from step b) by deep drawing, to form first and second heat exchanger plates;
   d) aligning the first and the second heat exchanger plates formed in step c) in such a manner that i) webs of the two heat exchanger plates border each other, ii) the heat exchanger channels form heat exchanger tubes, and iii) the forward-flow distribution apertures and the return collecting apertures do not overlap; and
   e) joining together the heat exchanger plates, as arranged in step d), to form the heat exchanger tube wherein the heat exchanger tubes span substantially an entire length of the heat exchanger plates in a longest dimension of the heat exchanger plates.

* * * * *